[11] 3,615,684

[72] Inventor Robert Workin
 Valley Stream, N.Y.
[21] Appl. No. 800,755
[22] Filed Feb. 19, 1969
[45] Patented Oct. 26, 1971
[73] Assignee International Multifoods Corporation
 Minneapolis, Minn.
 Continuation-in-part of application Ser. No. 782,415, Dec. 8, 1968, now abandoned.

[54] PASTRY SHELL MIX
 3 Claims, No Drawings
[52] U.S. Cl..................................................... 99/94, 99/88
[51] Int. Cl....................................................... A21d 13/08
[50] Field of Search........................................... 99/94, 88, 89

[56] References Cited
UNITED STATES PATENTS
2,796,350  6/1957  Grennan et al. .............. 99/92

Primary Examiner—Raymond N. Jones
Attorney—Merchant & Gould

ABSTRACT: A pastry shell mix for producing a product by the addition of water and baking consisting essentially of gelatinized wheat flour, gelatinized corn flour, gelatinized wheat starch and/or gelatinized corn starch; gelatinized tapioca starcy, fat, salt and as optional ingredients leavening and sodium caseinate.

PASTRY SHELL MIX

This application is a continuation-in-part of my application Ser. No. 782,415 filed Dec. 8, 1968, now abandoned.

The present invention relates to a pastry shell mix which may be used to form a pastry shell product which can be filled with cream, custard, ice cream and the like.

In conventional methods of preparing pastry shells for bakery items such as eclairs and cream puffs, it is necessary to cook a mixture of flour, shortening, water and salt in a steam-jacketed kettle directly over an open flame for a given period of time to produce a paste. The paste is then permitted to cool and then placed in a mixing bowl to which liquid eggs and/or milk or ammonium carbonate is added. After mixing these ingredients for approximately 7 minutes, the resulting dough is dropped out and baked in an oven.

The prior art method possesses many disadvantages. Expensive equipment is needed, numerous handling of various ingredients is necessary, and a great deal of time, labor and energy must be expended in order to produce a satisfactory final product. Also, the quality of the final product depends primarily upon the skill of the baker or operator.

There have been attempts to produce a pastry shell mix to which a baker can merely add water and eggs and, after baking, achieve a finished pastry product. However, it was necessary to add an excessive amount of water to prior art mixes in order to produce a workable batter prior to baking. In general, the resultant product was tough, rubbery, lacked volume, oddly shaped and cracked. Also, the final product was often poor in flavor, taste and appearance.

It is an object of the present invention to provide a pastry shell mix and, more particularly, to provide a pastry shell mix to which only liquid need be added prior to baking in order to produce the final pastry shell.

It is a further object of the present invention to provide a mix which may be utilized to produce a highly satisfactory pastry shell which may be used in the production of bakery goods such as eclairs and cream puffs without any prior experience on the part of the baker or operator.

It is still a further object of the present invention to provide a pastry shell mix which has a substantial shelf life.

Other objects will appear hereinafter.

The above and other objects are accomplished by means of the present invention. A pastry shell mix is provided which incorporates gelatinized wheat starch, gelatinized corn starch, gelatinized wheat flour and/or gelatinized corn flour together with gelatinized tapioca starch or flour in the presence of high quantities of fat. The high fat content has a limiting factor on the amount of fluid needed to produce a satisfactory end product. The fat also allows for a starch system under which excessive stress and strain are not encountered during baking. A normal mount of expansion of the product occurs in the oven and there is an easy release of steam from the product during baking so that wild and distorted forms are not produced in the finished product.

It is important that baking powder be added to the mix, not solely for attaining the desired volume, but rather to expand the product initially at a very fast rate before a heavy crust is produced during baking. A heavy crust prior to full expansion during baking will result in stress in the dough, and splits and wild cracks in the finished product.

The addition of a protein material such as sodium caseinate aids in producing good batter structure.

The dry mix of the present invention is comprised of gelatinized wheat flour, gelatinized corn flour, gelatinized wheat starch and/or gelatinized corn starch which is mixed with gelatinized tapioca starch, fat, salt and leavening.

The leavening utilized will be baking soda and acid, such as tartaric or phosphoric acid. Other suitable baking acids may be utilized in the dry mix if additional volume is desired.

The fat utilized may be oil, shortening, with or without emulsifiers or mixtures of each, although oil is preferable.

The oil may be any of the conventional cooking oils used to prepare pastry shells, such as animal and vegetable oils, including cottonseed oil, peanut oil, sesame oil, etc. The shortening used in the present invention may be animal shortening or vegetable shortening.

The gelatinized wheat flour, gelatinized corn flour, gelatinized wheat starch and/or gelatinized corn starch constitutes 25 to 40 percent by weight of the mix; the gelatinized tapioca starch constitutes 20 to 30 percent by weight of the mix; the fat constitutes 30 to 45 percent by weight of the mix; the salt constitutes 0.5–1.5 percent of weight of the mix; the leavening constitutes an effective amount up to 5 percent by weight of the mix; and sodium caseinate may constitute 0–6 percent by weight of the mix.

A ribbon blender may be utilized to blend the gelatinized flour or starch, salt, leaving, sodium caseinate, and the fat. The fat is fed slowly while the mix is blending. Mixing is continued until the fat is uniformly dispersed over the blended dry material. If 100 percent gelatinized wheat starch or flour is utilized as a starch source, the final product has been found to yield pastry products of unstable shapes, having thin crusts with poor eating quality. Also, if only gelatinized tapioca starch is utilized, the pastry product will have poor volume, heavy crust and dense wet-webbed centers.

The final mix can be stored for a substantial period of time without deterioration. In producing the final product, approximately, five parts by weight of the mix are mixed for 1 to 3 minutes at a low speed with approximately six parts by weight water to form a uniform mixture. Thereafter, approximately, six parts by weight of whole eggs are added and the composition is mixed an additional 3 to 5 minutes at medium speed to form a batter. Either dry or liquid eggs may be utilized. The batter temperature should be maintained at approximately 90° F. during all mixing steps. Thereafter, the product should be baked at about 400° F. for 40–45 minutes until done.

The following examples detail pastry shell mix compositions of the present invention.

Example No. 1

|  | Percent |
|---|---|
| Gelatinized Wheat Flour | 25 |
| Gelatinized Tapioca Starch | 25 |
| Oil or Fat | 40 |
| Salt | 1 |
| Leavening Caseinate | 5 |
| Sodium Caseinate | 4 |

Example No. 2

|  | |
|---|---|
| Gelatinized Wheat Flour | 30 |
| Gelatinized Tapioca Starch | 20 |
| Oil or Fat | 40 |
| Salt | 1 |
| Leavening | 5 |
| Sodium Caseinate | 4 |

Example No. 3

|  | |
|---|---|
| Gelatinized Wheat Flour | 27 |
| Gelatinized Tapioca Starch | 25 |
| Oil or Fat | 40 |
| Salt | 1 |
| Leavening | 1 |
| Sodium Caseinate | 6 |

Example No. 4

|  | |
|---|---|
| Gelatinized Wheat Flour | 30 |
| Gelatinized Tapioca Starch | 30 |
| Oil or Fat | 30 |
| Salt | 1 |
| Leavening | 5 |
| Sodium Caseinate | 4 |

Example No. 5

| | |
|---|---|
| Gelatinized Wheat Flour | 40 |
| Gelatinized Tapioca Starch | 26 |
| O.1 or Fat | 30 |
| Salt | 1 |
| Leavening | 1 |
| Sodium Caseinate | 2 |

Example No. 6

| | |
|---|---|
| Gelatinized Tapioca Starch | 25 |
| Oil or Fat | 40 |
| Salt | 1 |
| Leavening | 5 |
| Sodium Caseinate | 4 |
| Gelatinized Wheat Starch | 25 |

Example No. 7

| | |
|---|---|
| Gelatinized Tapioca Starch | 20 |
| Oil or Fat | 40 |
| Salt | 1 |
| Leavening | 5 |
| Sodium Caseinate | 4 |
| Gelatinized Wheat Starch | 30 |

Example No. 8

| | |
|---|---|
| Gelatinized Tapioca Starch | 25 |
| Oil or Fat | 40 |
| Salt | 1 |
| Leavening | 1 |
| Sodium Caseinate | 6 |
| Gelatinized Wheat Starch | 27 |

Example No. 9

| | |
|---|---|
| Gelatinized Tapioca Starch | 30 |
| Oil or Fat | 30 |
| Salt | 1 |
| Leavening | 5 |
| Sodium Caseinate | 4 |
| Gelatinized Wheat Starch | 30 |

Example No. 10

| | |
|---|---|
| Gelatinized Tapioca Starch | 26 |
| Oil or Fat | 30 |
| Salt | 1 |
| Leavening | 1 |
| Sodium Caseinate | 2 |
| Gelatinized Wheat Starch | 40 |

Example No. 11

| | |
|---|---|
| Gelatinized Wheat Starch | 29 |
| Gelatinized Tapioca Starch | 25 |
| Oil or Fat | 40 |
| Salt | 1 |
| Leavening | 5 |

Example No. 12

| | |
|---|---|
| Gelatinized Tapioca Starch | 25 |
| Oil or Fat | 40 |
| Salt | 1 |
| Leavening | 5 |
| Gelatinized Wheat Starch | 29 |

Example No. 13

| | |
|---|---|
| Gelatinized Wheat Flour | 40 |
| Gelatinized Tapioca Starch | 28 |
| Oil or Fat | 30 |
| Salt | 1 |
| Leavening | 1 |

Example No. 14

| | |
|---|---|
| Gelatinized Tapioca Starch | 28 |
| Oil or Fat | 30 |
| Salt | 1 |
| Leavening | 1 |
| Gelatinized Wheat Starch | 40 |

Example No. 15

| | |
|---|---|
| Gelatinized Wheat Flour | 30 |
| Gelatinized Tapioca Starch | 25 |
| Oil or Fat | 40 |
| Salt | 1 |
| Sodium Caseinate | 4 |

Example No. 16

| | |
|---|---|
| Gelatinized Wheat Flour Gelatinized | 15 |
| Gelatiniced Corn Flour | 15 |
| Gelatinized Tapioca Starch | 25 |
| Oil or Fat | 40 |
| Salt | 1 |
| Sodium Caseinate | 4 |

Example No. 17

| | |
|---|---|
| Gelatinized Wheat Flour | 10 |
| Gelatinized Corn Flour | 10 |
| Gelatinized Wheat Starch | 10 |
| Gelatinized Corn Starch | 10 |
| Gelatinized Tapioca Starch | 28 |
| Oil or Fat | 30 |
| Salt | 1 |
| Leavening | 1 |

Example No. 18

| | |
|---|---|
| Gelatinized Corn Flour | 29 |
| Gelatinized Tapioca Starch | 25 |
| Oil or Fat | 40 |
| Salt | 1 |
| Leavening | 5 |

Example No. 19

| | |
|---|---|
| Gelatinized Corn Starch | 30 |
| Gelatinized Tapioca Starch | 20 |
| Oil or Fat | 40 |
| Salt | 1 |
| Leavening | 5 |
| Sodium Caseinate | 4 |

Example No. 20

| | |
|---|---|
| Gelatinized Wheat Flour | 10 |
| Gelatinized Wheat Starch | 15 |
| Gelatinized Tapioca Starch | 25 |
| Oil or Fat | 40 |
| Salt | 1 |
| Leavening | 5 |

Example No. 21

| | |
|---|---|
| Gelatinized Wheat Flour | 10 |
| Gelatinized Corn Starch | 20 |
| Gelatinized Tapioca Starch | 20 |
| Oil or Fat | 40 |
| Salt | 1 |
| Leavening | 5 |
| Sodium Caseinate | 4 |

Example No. 22

| | |
|---|---|
| Gelatinized Wheat Flour | 20 |
| Gelatinized Wheat Starch | 10 |
| Gelatinized Corn Flour | 10 |
| Gelatinized Tapioca Starch | 26 |
| Oil or Fat | 30 |
| Salt | 1 |
| Leavening | 1 |
| Sodium Caseinate | 2 |

Example No. 23

| | |
|---|---|
| Gelatinized Wheat Flour | 10 |
| Gelatinized Wheat Starch | 10 |
| Gelatinized Corn Starch | 7 |
| Gelatinized Tapioca Starch | 25 |
| Oil or Fat | 40 |
| Salt | 1 |
| Leavening | 1 |
| Sodium Caseinate | 6 |

Example No. 24

| | |
|---|---|
| Gelatinized Wheat Starch | 25 |
| Gelatinized Corn Flour | 15 |
| Gelatinized Tapioca Starch | 26 |
| Oil or Fat | 30 |
| Salt | 1 |
| Leavening | 1 |
| Sodium Caseinate | 2 |

Example No. 25

| | |
|---|---|
| Gelatinized Wheat Starch | 16 |
| Gelatinized Corn Starch | 13 |
| Gelatinized Tapioca Starch | 25 |
| Oil or Fat | 40 |
| Salt | 1 |
| Leavening | 5 |

Example No. 26

| | |
|---|---|
| Gelatinized Wheat Starch | 10 |
| Gelatinized Corn Flour | 10 |
| Gelatinized Corn Starch | 20 |
| Gelatinized Tapioca Starch | 28 |
| Oil or Fat | 30 |
| Salt | 1 |
| Leavening | 1 |

Example No. 27

| | |
|---|---|
| Gelatinized Corn Flour | 10 |
| Gelatinized Corn Starch | 20 |
| Gelatinized Tapioca Starch | 25 |
| Oil or Fat | 40 |
| Salt | 1 |
| Sodium Caseinate | 4 |

When higher percentages of tapioca starch are utilized the resultant product is moister. Greater volume of the final product is obtained when larger amounts of protein and corn or wheat starch are present in the pastry mix. The product will be flakier when the larger amounts of corn or wheat starch are present in the pastry mix.

There is no ungelatinized material in the pastry mix. Also, upon cooking the ingredients as per the prescribed method, there is no ungelatinized material in the final product.

The present invention may be embodied in other specific forms without departing from the spirit or essential attributes thereof.

It is claimed:

1. A pastry shell mix consisting essentially of from 25 to 40 weight percent of a member selected from gelatinized wheat flour, gelatinized corn flour, gelatinized corn starch, gelatinized wheat starch and mixtures thereof, from 20 to 30 weight percent of gelatinized tapioca starch, from 30 to 45 weight percent of fat, and from 0.05 to 1.5 weight percent of salt.

2. A pastry shell mix in accordance with claim 1 which contains leavening in an effective amount up to 5 percent by weight of the mix, said amount being sufficient to attain the desired volume as well as to expand the product initially at a very fast rate.

3. A pastry shell mix in accordance with claim 2 in which contains sodium caseinate in an effective amount up to 6 percent by weight of the mix.

* * * * *